B. P. SAUNDERS.
TRAP.
APPLICATION FILED MAR. 18, 1913.
1,088,099.
Patented Feb. 24, 1914.
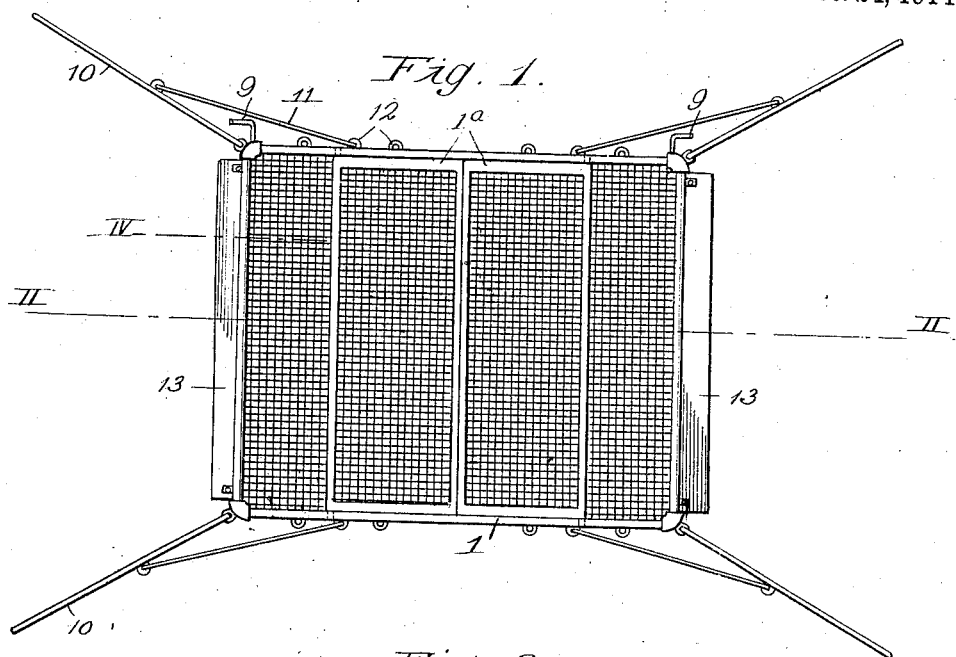
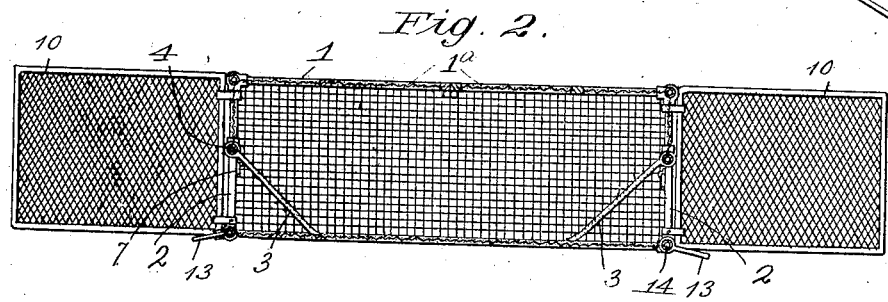
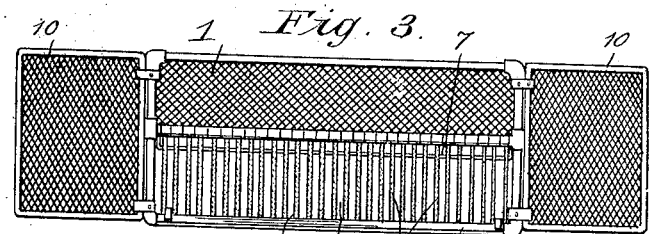
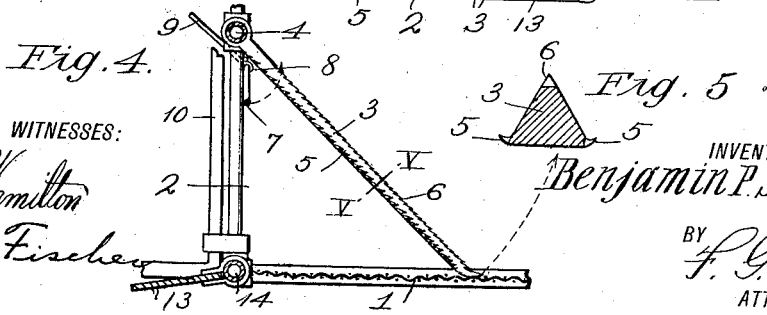
WITNESSES:
R. Hamilton
L. J. Fischer
INVENTOR:
Benjamin P. Saunders
BY
F. G. Fischer,
ATTORNEY.

UNITED STATES PATENT OFFICE.

BENJAMIN P. SAUNDERS, OF IATAN, MISSOURI.

TRAP.

1,088,099.

Specification of Letters Patent. Patented Feb. 24, 1914.

Application filed March 18, 1913. Serial No. 755,107.

*To all whom it may concern:*

Be it known that I, BENJAMIN P. SAUNDERS, citizen of the United States, residing at Iatan, in the county of Platte and State of Missouri, have invented certain new and useful Improvements in Traps, of which the following is a specification, My invention relates to improvements in traps, and my object is to provide a novel trap of this character whereby fish, birds, or other game may be taken alive and without injury thereto.

In order that the invention may be fully understood, reference will now be made to the accompanying drawings, in which:

Figure 1 shows a plan view of the trap ready for use. Fig. 2 is a longitudinal section on line II—II of Fig. 1. Fig. 3 is a front elevation of the trap. Fig. 4 is an enlarged broken section on line IV of Fig. 1. Fig. 5 is an enlarged cross section on line V—V of Fig. 4.

In carrying out my invention, I employ a receptacle 1 having an opening 2 at each end thereof, so that game may enter therein.

Openings 2 are normally closed by a plurality of fingers 3, pivotally-mounted side by side upon transverse tubes or rods 4, constituting part of the receptacle frame. Fingers 3 incline inwardly at an angle of about 45 degrees and rest at their free ends upon the bottom of the receptacle, and each finger is free to swing upwardly independently of its companions. Hence, an animal, bird or fish can enter the receptacle 1 without permitting other game therein to escape.

Each finger 3 is substantially triangular in cross section as shown on Fig. 5, and provided at its forward longitudinal edges with rearwardly-turned teeth 5, which prevent a fish or animal from retreating after raising one or more fingers to enter the receptacle 1. The rear edge of each finger has downwardly and rearwardly extending serrations 6, adapted to prick a fish or animal should it attempt to escape after having entered the receptacle 1.

7 designates crank shafts mounted in bearings 8 at the openings 2. Each crank-shaft is provided at one end with a handle 9, whereby it may be rocked for the purpose of simultaneously raising all the fingers at its respective end of the receptacle when it is desired to remove the game therefrom.

When desired, access may be had to the interior of the receptacle 1 to remove the game, through an opening in the top of said receptacle, which opening is normally closed by two doors 1ª, which may be secured in closed position by any suitable means.

10 designates a pair of wings pivotally-mounted at the sides of each opening 2, for the purpose of directing game to said openings. The free ends of each pair of wings may be adjusted toward or away from each other to cover more or less ground, and are locked in any of their adjusted positions by retaining-members 11, each of which is loosely secured at one end to its respective wing and bent into hook-form at its opposite end to engage any of the eyes 12 at the adjacent side of the receptacle.

13 designates an apron hinged to the cross rod or tube 14 forming part of the receptacle frame and located at the bottom of each opening 2.

When the trap is to be employed for catching fish, it is located on the bottom of a stream upon which the free ends of the aprons 13 rest to prevent the fish from passing beneath the receptacle 1, which latter is placed lengthwise of the stream, so that fish passing up or down said stream will be directed to openings 2 by the wings 10, which are spread apart to direct the fish to the openings.

The receptacle 1 and wings 10, are, preferably, made of wire or other foraminous material to admit air, light and water.

While I have shown the preferred construction of my invention, I of course, reserve the right to make such changes in construction, combination, and arrangement of parts as properly fall within the spirit and scope of the appended claim.

Having thus described my invention, what I claim and desire to secure by Letters Patent is:

In a trap of the type set forth, a receptacle having an opening, and a plurality of independently mounted spaced fingers for normally closing the opening, each finger having inward movement only and being formed of a bar of substantially triangular cross-section, the apex of each triangular bar facing the interior of the trap and being provided with a series of serrations, each of the longitudinal edges of said bars at the bases of the triangles thereof being provided with rearwardly turned teeth which teeth project out beyond the sides of the bars toward the adjacent bars.

In testimony whereof I affix my signature, in the presence of two witnesses.

BENJAMIN P. SAUNDERS.

Witnesses:
F. G. FISCHER,
L. J. FISCHER.